United States Patent Office 3,401,626
Patented Sept. 17, 1968

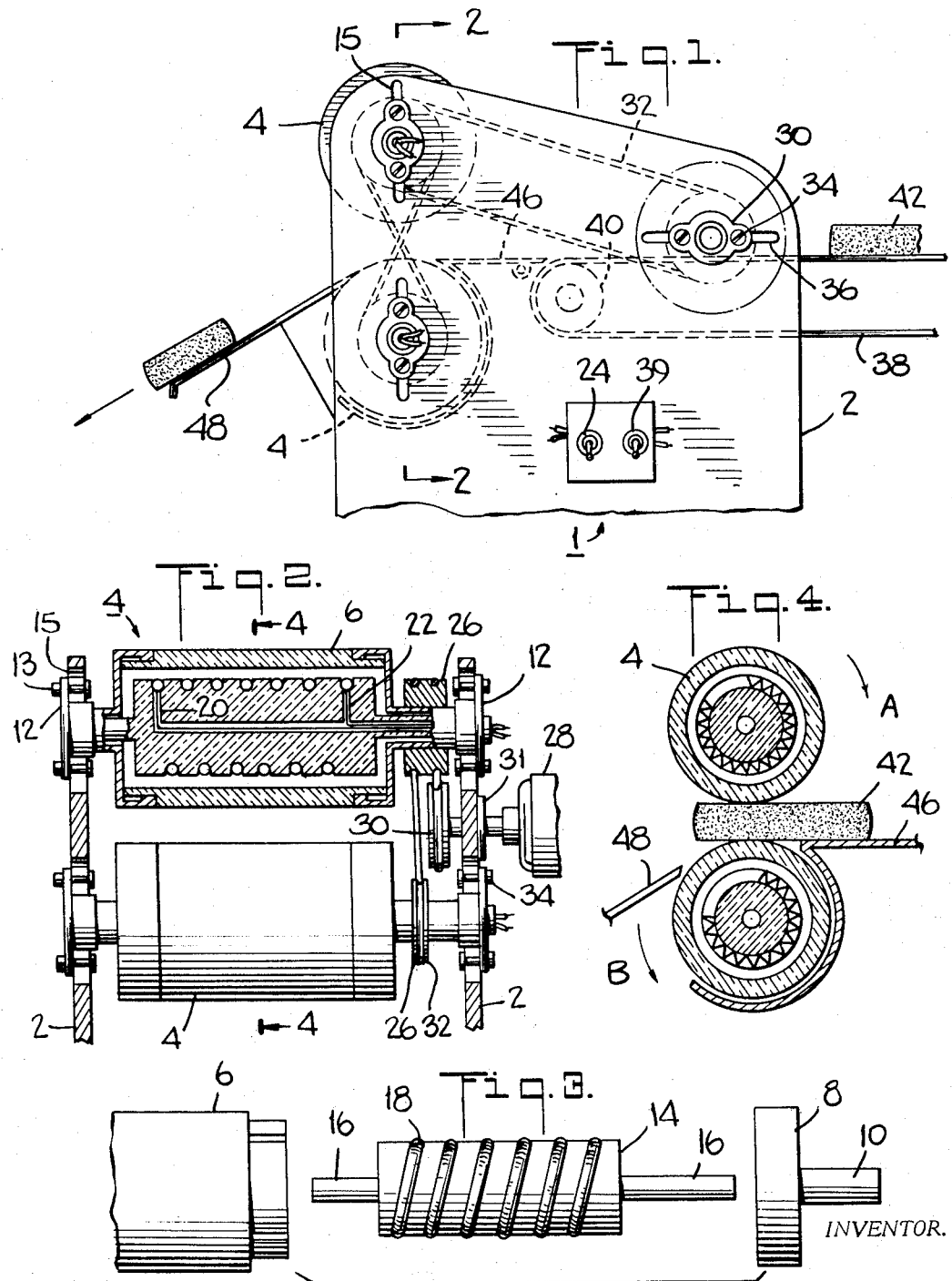

3,401,626
QUARTZ RADIANT HEATER
Jerry S. Amalfitano, 1175 84th St.,
Brooklyn, N.Y. 11228
Filed Feb. 21, 1966, Ser. No. 529,129
4 Claims. (Cl. 99—386)

ABSTRACT OF THE DISCLOSURE

A food heating apparatus having heated rotatable quartz surfaces which are adapted to engage and traverse an article of food, thereby heating said article of food to a desired degree.

---

The present invention relates to a novel heating apparatus, and more particularly, to a novel electrical heating apparatus especially adapted for cooking and traversing meat products and the like.

It is generally known in the art that particular advantages are derived by the employment of radiant energy from quartz in heating or cooking of foods. The quartz radiation has the particular feature of simulating, to a great extent, the distinctive and desirable flavor in foods heretofore achieved only through the use of charcoal, yet eliminating the undesirable cleaning problems associated with charcoal food preparation. The similarity between charcoal radiated food and quartz radiated food is generally due to the alikeness in their radiation characteristics. Both sources emit radiant energy in the upper-wave band of the spectrum and additionally, both emit their radiant energy from their total bodies.

The effect of radiant energy of the upper-wave band of the spectrum is to direct heat to the outside portion of the food product. The wave lengths are generally too long to penetrate to the interior and are concentrated on this outside surface. This is advantageous for the cooking of meats in particular, as the internal juices are formed and retained while the outside surface of the meat becomes crisp and charred.

The quartz radiant food cooking apparatus heretofore used have generally relied entirely on the radiant energy emitted from the quartz radiator to carry out the cooking operation. Such methods are, however, not conducive to automated food cooking processes where the food must not only be subjected to a controlled cooking operation but additionally must economically and reliably be traversed through the process from a predetermined feed to a subsequent operation that may be performed on such food.

The present invention is characterized by the provision of means to heat an article of food under controlled conditions by utilizing both the radiant energy emitted from a quartz member and also conductive heat transfer. Thus the desirable flavor imparted to quartz radiation prepared food may be obtained, yet additional heat for thorough food cooking is available by direct conduction to the product.

Also, means are provided in the present invention whereby a selected food, such as meat, may be fed into the cooking apparatus whereby the food is thereafter traversed through the cooking process and deposited in such a manner as to make further automatic operations feasible. Thus, the entire cooking operation may easily be made a component of more extensive food preparation cycle without the necessity for any manual preparation such as loading or unloading of the apparatus.

It is therefore the object of the present invention to provide a novel food cooking apparatus.

It is also an object of this invention to provide in a food cooking apparatus, novel means for providing heat to a selected food product.

A further object of this invention is to provide in a cooking apparatus, novel means for providing heat to selected food products including means to traverse such food products through the cooking apparatus.

It is an added object of this invention to provide in a cooking apparatus a food heating means which utilizes radiant energy of predetermined wavelength band and also conductive heat.

Another object of the present invention is to provide a cooking apparatus having means automatically to receive selected food products fed thereto, subject such foods to a heating operation and discharge the same in a predetermined position.

Other objects and advantages of the invention will be set forth in part hereafter and in part will be obvious herefrom, or may be learned by practice with the invention, the same being realized and attained by means of the instrumentalities and combinations pointed out in the appended claims.

The invention consists in the novel parts, construction, arrangements, combination and improvements herein shown and described.

Although the description hereafter provided contemplates a heating of meat or other food products, it may be readily apparent to those skilled in the art that the apparatus is equally applicable to the heating or drying of a wide variety of other objects without departing from the spirit of the invention.

The accompanying drawings, referred to herein and constituting a part hereof, illustrate one embodiment of the invention, and together with the description, serve to explain the principles of the invention.

FIG. 1 is a side elevation of the food cooking apparatus.

FIG. 2 is a partial sectional view taken along line 2—2, FIG. 1.

FIG. 3 is a perspective view of a heating means of the present invention in disassembled form.

FIG. 4 is a sectional view taken along lines 4—4, FIG. 2.

Referring specifically to FIG. 1, the food cooking apparatus 1 comprises a base foundation having upstanding sides 2 which generally provide support for the various components.

A plurality of quartz surfaces, described and shown as cylindrical rollers 4, are rotatably mounted between the base sides 2 and arranged in a predetermined position with respect to each other.

Turning now to FIGS. 2 and 3, the cylindrical quartz rollers comprise a central hollow cylindrical portion 6 constructed of quartz and which furnishes the radiant and conductive heat which is applied to the feed article. An end cover 8 is provided at both ends of the cylindrical portion 6 and is firmly affixed thereto. The end covers 8 serve to seal the internal area of the quartz cylindrical portions 6 and prevent the entrance of contaminants.

A hollow hub 10 extends from the end covers and is rotatably mounted within flange members 12. The rotatable mounting may be achieved by the use of known bearing means within the flange members, such bearing means affording free rotative movement to the end covers 8 while curtailing any lateral traversement thereof.

The flange members themselves are secured to the upstanding sides 2 of the base foundation by clamping screws 13 which are provided through elongated openings 15 in the upstanding sides, thereby allowing a lateral adjustment available.

Heating means is provided to transfer heat energy to the quartz rollers during the cooking operation of the present invention. In the preferred embodiment as shown, particularly in FIG. 3, the heating means comprises a core member 14 of suitable heat resistant material. A pair of hollow shafts 16 extend from the core member through the hollow hubs 10 of the end covers 8 in substantially a coaxial relationship. The hollow shafts 16 are also secured in position by means of the flange members, however, the shafts and therefore the core member 14 are held in a stationary position. Again, any known bearing means within the flange members 12 may be used whereby the internal hollow shaft 16 may be held stationary while allowing outer coaxial hollow hubs 10 to remain rotatable.

A high resistance heating coil 18 is provided spirally wound around substantially the entire length of the core member 14. Electrical connections are provided to each end of the heating coil 18 by means of lead wires 20 and 22 which are passed through the hollow shaft 15 and through the core member 14 by suitably provided passages.

External electrical power may be provided, not shown, by any common available current supply and may be controlled by means such as switch 24 located convenient to an operator of the cooking apparatus.

A driving means is provided to rotate the quartz rollers 4 in the proper direction and at a desired velocity. As shown in FIG. 2, this driving means may comprise a belt driven pulley system. A driven pulley 26 may be affixed by a force frictional engagement or a keyway, to the external diameter of each of the rotatable hollow hubs 10. Either of the driven pulleys 26 may comprise a double groove type to provide for the use of two belts.

A motor 28, or other driving means, is provided having a driving pulley 30 in general plane alignment with one groove of the double groove pulley. A pair of belts 32 couple the driving pulley to the double groove driven pulley and also the double groove pulley to the remaining driven pulley 26.

The belts are arranged such that normal rotation of the driving means causes each of the rotative quartz rollers 4 to rotate in the direction of the arrows A and B with a minimum of slippage.

The driving shaft of the motor 28 is journaled through a flange bearing 31 which is adjustably secured to the upstanding sides 2 of the base foundation by means of clamping screws 34 threaded through a set of elongated holes 36 in the upstanding sides.

Frequently, some adjustment may be desired in the lateral distance separating the quartz rollers 4 to compensate for various thicknesses of food or meat products selected to be cooked. Such adjustment may easily be made by loosening the clamping screws 13 at opposite ends of either or both quartz rollers 4. The flange members 12 which support and locate the quartz rollers may then be moved along the elongated holes 15, thereby causing the quartz rollers 4 to be moved toward or away from each other along a common line. The clamping screws 13 are then tightened to secure the quartz rollers 4 in the exact position desired.

A second adjustment may then be required to reset the tension of belt 32 between the driving pulley 30 and the double groove pulley 26 in order to insure the proper frictional engagement. This adjustment is accomplished by loosening clamping screws 34 and traversing the flange bearing 31 along the elongated hole 36, thereby adjusting the driving pulley 30 either toward, or away from its driven pulley 26. In this way, the tension of the belt may readily be adjusted to the desired amount and retained by retightening clamping screws 34 when an optimum position is reached.

Any suitable known means, not shown, may be employed to correct belt tension in belt 32 between the two driven pulleys 26. Such known means include the use of an idler pulley or tension roller which may be adjustable to various positions to correct the belt tension when the lateral distance between the driven pulleys 26 is altered.

Although the foregoing is sufficient to give an overall description of the present invention, a brief summary of its operation is included to better clarify and point out its functions.

A food product, such as meat, may be fed to the quartz rollers 4 of the present cooking apparatus by a variety of means. Such means may be manual, however, the cooking apparatus of the present invention is adaptable and is preferred for use with some automatic feeding means.

An automatic means is shown in FIG. 1 of the drawings and comprises generally a wide flat belt 38 which circles about a roller 40 in predetermined fixed position with respect to the cooking apparatus. The flat belt 38 is continuously driven by electrical means, now shown, controlled by a switch such as 39, located at a convenient point for an operator. The belt serves to bring a food product, shown as 42, into frictional engagement with the moving members of the cooking apparatus. As the food product progresses toward the quartz rollers 4, it enters upon a feed table 46 of such width as to permit the food particle to traverse up to its engagement with the quartz rollers without losing the driving force acquired from the continuously moving flat belt 38.

As shown in FIG. 4, the food product is then fed into and thereafter traversed by the quartz rollers 4.

The quartz rollers, themselves, have been preheated to a predetermined desired temperature and are continuously maintained at such temperature by the heating means heretofore described and located internally of said quartz rollers in a stationary position.

The food product 42 is thereby frictionally engaged by the quartz rollers 42 and then rotative movement in accordance with the arrows A and B serve to frictionally traverse such food product through the cooking cycle and discharge the food product into a means such as discharge tray 48, the heated product thereafter being delivered to a further process if desired.

The cooking cycle itself is a combination of heat directly conducted to the food product by the frictional engagement of the heated quartz rollers as well as the desirable radiant energy transmitted to the food product as a result of the curvature of the quartz rollers away from the food product on either side of the line of frictional contact.

What is claimed is:

1. In a food heating apparatus, a plurality of rotatable quartz surfaces, heating means positioned within said surfaces and adapted to heat the same, driving means adapted to move said surfaces, said surfaces positioned such that an article of food received therebetween is frictionally engaged and traversed by said surfaces, thereby causing said article to be heated by a combination of quartz emitted radiation and directly conducted heat energy.

2. A food heating apparatus, as defined in claim 1, wherein said rotatable quartz surfaces comprise cylindrical rollers.

3. A food heating apparatus, as defined in claim 2, wherein said heating means positioned within said rollers includes a stationary core member, an electrical resistance wire spirally wound substantially along the length of a said core member and electrical means adapted to energize said electrical resistance wire.

4. A food heating apparatus, as defined in claim 2, wherein said plurality of rotatable quartz surfaces comprise a pair of quartz rollers having their axis substantially in parallel, the linear distance between said axes being adjustable along a predetermined range.

References Cited

UNITED STATES PATENTS

| | | | |
|---|---|---|---|
| 1,271,577 | 7/1918 | Jeannetaud | 100—93 |
| 1,628,554 | 5/1927 | Pagano | 219—470 XR |
| 2,185,979 | 1/1940 | Dumas | 99—423 |
| 2,226,036 | 12/1940 | Watson | 99—390 XR |
| 2,243,492 | 5/1941 | Wilson | 99—373 XR |
| 2,615,113 | 10/1952 | Frye | 100—93 |
| 3,189,729 | 6/1965 | Lusebrink | 219—469 |
| 3,291,036 | 12/1966 | Perl | 99—358 |

FOREIGN PATENTS 457,230   5/1950   Italy.

BILLY J. WILHITE, *Primary Examiner.*